United States Patent
Gafner et al.

(10) Patent No.: US 12,123,812 B2
(45) Date of Patent: Oct. 22, 2024

(54) AUTOMATED PREPARATION OF SAMPLE MATERIALS FOR CHEMICAL ANALYSIS

(71) Applicant: ACCROMA LABTEC AG, Muttenz (CH)

(72) Inventors: Stefan Gafner, Rümlingen (CH); Beat Federer, Bern (CH)

(73) Assignee: ACCROMA LABTEC AG, Muttenz (CH)

( * ) Notice: Subject to any disclaimer, the term of this patent is extended or adjusted under 35 U.S.C. 154(b) by 688 days.

(21) Appl. No.: 17/267,994

(22) PCT Filed: Aug. 13, 2019

(86) PCT No.: PCT/EP2019/071638
§ 371 (c)(1),
(2) Date: Feb. 11, 2021

(87) PCT Pub. No.: WO2020/035467
PCT Pub. Date: Feb. 20, 2020

(65) Prior Publication Data
US 2021/0239579 A1    Aug. 5, 2021

(30) Foreign Application Priority Data
Aug. 13, 2018   (CH) .................................. 00983/18

(51) Int. Cl.
  *G01N 1/28* (2006.01)
  *B02C 17/06* (2006.01)
  *B02C 17/18* (2006.01)

(52) U.S. Cl.
  CPC ............ *G01N 1/286* (2013.01); *B02C 17/06* (2013.01); *B02C 2017/065* (2013.01); *B02C 17/182* (2013.01); *G01N 2001/2866* (2013.01)

(58) Field of Classification Search
  CPC ............................................. G01N 2001/2866
  See application file for complete search history.

(56) References Cited

U.S. PATENT DOCUMENTS

| 4,505,433 A | 3/1985 | Selenke |
| 4,663,314 A * | 5/1987 | Hayase ............... C07F 7/0812 556/427 |

(Continued)

FOREIGN PATENT DOCUMENTS

| CN | 201500480 U | 6/2010 |
| CN | 201987980 U | 9/2011 |

(Continued)

OTHER PUBLICATIONS

International Search Report and Written Opinion dated Nov. 14, 2019 in corresponding International Application No. PCT/EP2019/071638.

(Continued)

*Primary Examiner* — Jamel E Williams
*Assistant Examiner* — Alex T Devito
(74) *Attorney, Agent, or Firm* — MEDLER FERRO WOODHOUSE & MILLS PLLC (57) ABSTRACT

A method of automated preparation of a sample material for a chemical or compositional analysis is disclosed that includes arranging the sample material in a receptacle, storing the sample inside the receptacle in a conditioning cabinet, and grinding the sample material by way of a ball mill apparatus. The ball mill apparatus may include an extraction container, at least one grinding element provided in the extraction container and an agitator adapted to move the at least one grinding element relative to the extraction container when the sample material is placed in the extraction container. The method may further include placing the sample material together with the receptacle in the extraction container, and grinding the receptacle together with the sample material by agitating the extraction container.

21 Claims, 3 Drawing Sheets

(56) References Cited

U.S. PATENT DOCUMENTS

| | | | | |
|---|---|---|---|---|
| 5,713,369 A | * | 2/1998 | Tao | A61B 10/0291 |
| | | | | 600/569 |
| 2009/0101738 A1 | | 4/2009 | Stitt et al. | |

FOREIGN PATENT DOCUMENTS

| | | | | |
|---|---|---|---|---|
| CN | 103432796 A | | 12/2013 | |
| IN | 106390749 A | | 2/2017 | |
| NL | 1033967 | * | 8/2007 | |
| WO | 90/14798 A1 | | 12/1990 | |
| WO | 20130156923 A2 | | 10/2013 | |
| WO | WO-2013179232 A1 | * | 12/2013 | B01F 11/0005 |

OTHER PUBLICATIONS

Anonymous: "Instagram Accroma", (Nov. 8, 2017), XP055531184, Retrieved from the Internet: URL: https://www.instagram.com/p/Bb01bQInV1o/ [retrieved on Dec. 6, 2018] the whole document.

* cited by examiner

AUTOMATED PREPARATION OF SAMPLE MATERIALS FOR CHEMICAL ANALYSIS

TECHNICAL FIELD

The present invention relates to a method of automated preparation of a sample material, such, e.g., in form of a tablet, powder, gel, paste or fluid, for a chemical or compositional analysis according to the preamble of independent claim 1, and more particularly to an automated system for the preparation of a sample material, by way of a ball mill apparatus.

Such methods may involve the steps of: arranging the sample material in a receptacle, storing the sample inside the receptacle in a conditioning cabinet, and grinding the sample material by way of a ball mill apparatus, wherein the ball mill apparatus comprises an extraction container, at least one grinding element provided in the extraction container and an agitator adapted to move the grinding elements relative to the extraction container when the sample material is placed in the extraction container.

Automated systems for the preparation of a sample material, and correlated methods, can be used in connection with separation processes aimed at making a sample of a given material suitable for a subsequent chemical or compositional analysis requiring a preliminary fine size-reduction and homogenisation. The sample material processed can take many forms, as mentioned, and can be inorganic, organic or biological. In particular, the sample material can be a hard and/or dry and/or brittle material, but also a softer material containing moisture, as in a biological tissue, or a viscous flowing mass in general. Therefore the method according to the present invention can be advantageously employed not only in the chemical and bio-chemical industry, but for instance also in food industry such as if a food sample is to be analysed for heavy metals, pesticides and similar substances. The automated method and system according to the present invention can be adapted to specific requirements of different areas of application, such as construction materials, metallurgy, textiles, pharmaceuticals or environmental analysis.

The automated method and system according to the present invention can be operated to bring samples into a homogenous pulverized state and to prepare them perfectly for either additional sample preparation steps, and/or for subsequent analysis steps.

Subsequent analysis can involve separating analytical methods like high-performance liquid chromatography (HPLC; formerly referred to as high-pressure liquid chromatography), or ultra performance liquid chromatography (UPLC), used to separate, identify, and quantify each component in a sample mixture.

BACKGROUND ART

Ball mills or agitator ball mills are known for grinding, crushing, shredding or breaking up of samples prior to chemical analysis and typically comprise an agitatable extraction container, for instance in the form of a tube or jar module, internally provided with grinding elements. By inducing an appropriate movement of the grinding elements within an interior of the extraction container, the sample is size-reduced as a result of the impacts, the pressure, the shearing and the friction applied by the grinding elements. Such procedure implies the collection of a sample from a storing position, wherein the sample is typically contained in a vial retained in a vial rack recess.

Often, before being analysed, the samples are to be stored in specific conditions in order allow maintaining the original or required properties of the sample. For example, it may be desired to adjust a pressure, temperature and humidity in which the samples are stored. For that purpose, conditioning cabinets are used which may receive the samples in an appropriate manner. For example, the conditioning cabinets may be provided with a vial rack recess for receiving the samples stored in vials.

According to conventional practices, for preparing a sample it has to be gathered from its vial or similar container usually stored in the conditioning cabinet. This may happen by manual execution or by some automatic handling apparatus. The vial or container in which the sample is contained needs to be carefully opened in order to enable taking out the sample and its consequent introduction into a ball mill's extraction container.

The several handling passages required when taking a sample out from inside a conditioning cabinet, withdrawing it from a vial or other container and transferring it to a ball mill's extraction container bears the risk of contamination from other sources in the laboratory, of physical losses, for instance due to disaggregation, or for alterations due to dissipation, oxidation or other reactions with the environment, volatilization or similar occurrences. Also, loss of the sample might occur due to inaccurate handling or processing.

However, one major goal of laboratory sample preparation is to provide, without sample loss, a representative sample amount that is free of any contamination to be used in the next steps of analysis protocol. Physical manipulation of the sample should be limited to those techniques which are essentially required for the optimal preparation and unnecessary steps prone to introducing a mistake in the subsequent sample measuring should be avoided. In fact, an analytical measurement is good to the extent that the sample preparation that has preceded it has been carried out properly. If a sample amount taken for analysis does not represent the original sample accurately, the results of such analysis become questionable.

Therefore, there is a need for an automated method and system for the preparation of a sample material allowing a fast, simplified but also safe handling of sample material which minimizes sample losses and prevents contamination thereof.

DISCLOSURE OF THE INVENTION

According to the invention this need is settled by a method as it is defined by the features of independent claim 1 and by an automated system as it is defined by the features of independent claim 13. Preferred embodiments are subject of the dependent claims.

In one aspect, the invention is a method of automated preparation of a sample material for a chemical or compositional analysis. The sample material can have any suitable form such as the form of a tablet or other essentially solid body, a powder, a gel, a paste, a fluid or the like. The chemical or compositional analysis can particularly be or involve high performance liquid chromatography (HPLC) or ultra high performance liquid chromatography (UHPLC or UPLC). The method according to the invention comprises the steps of: (i) arranging the sample material in a receptacle, (ii) storing the sample inside the receptacle in a conditioning cabinet, (iii) grinding the sample material by way of a mill apparatus, wherein the mill apparatus comprises an extraction container, at least one grinding element provided in the extraction container and an agitator adapted to move the at least one grinding element relative to the extraction container when the sample material is placed in the extraction container, (iv) placing the sample material together with the receptacle in the extraction container, and (v) grinding the receptacle together with the sample material by agitating the extraction container.

The term "agitating" as used herein relates to any action or process inducing a movement of the grinding element(s) inside the extraction container. In a comparably simple and efficient embodiment agitating comprises vibrating or shaking the extraction container such that the grinding element(s) move inside the extraction container due to their inertia and stimuli of the extraction container. It may also comprise activating the grinding element(s) for example by magnetic forces or the like.

The term "conditioning cabinet" can relate to a system allowing to provide preferred conditions for storing the sample material. In particular, it can allow to adjust temperature (cooling or heating), pressure, humidity and the like. The cabinet can comprise plural compartments such as drawers or the like, in which the conditions can be adjusted individually. Also, the conditioning cabinet can be configured to store the receptacle in a sterile manner.

The term "grinding" as used herein can relate to any process of making smaller pieces out of a bigger element. It may comprise chopping, hackling, shredding, hashing, cutting, mincing, chopping, crushing, squeezing or the like, or any combination thereof. Thereby, the grinding can be performed by the mill apparatus under dry conditions, wet conditions or any combination thereof.

The term "receptacle" can relate to any containment suitable for receiving or holding the sample material during storage thereof. Advantageously, the receptacle is made of an inert material such as glass. In one suitable embodiment the receptacle is a vial.

The term "vial" as used herein can relate to vials in the literal sense, i.e. a comparably small vessel or bottle, often used to store pharmaceutical products or pharmaceuticals or medications in liquid, powdered or capsuled form. The vial can be made of a sterilisable material such as glass or plastic such as, e.g., polypropylene. It typically comprises a cover or cap including a sealing such as a rubber stopper or a septum which for many applications is designed to be pierced.

The sample material can particularly involve a drug. Thereby, the term "drug" relates to a therapeutically active agent, also commonly called active pharmaceutical ingredient (API), as well as to a combination of plural such therapeutically active substances. The term also encompasses diagnostic or imaging agents, like for example contrast agents (e.g. MRI contrast agents), tracers (e.g. PET tracers) and hormones, that need to be administered in liquid form to the patient.

By providing the sample material into the extraction container together with the receptacle, processing of the sample material can essentially be simplified. In particular, it can be prevented that the sample material has to be gathered from the receptacle and transferred to the extraction container by its own. Particularly, when a sample material is involved which doesn't easily exit the receptacle, such as a sample material of a comparably high viscosity or a sticky sample material, this can essentially ease the process. Besides of simplifying the process, this also allows for preventing impairment of the sample material. For example, the risk of contaminating the sample material during transfer from the conditioning cabinet to the extraction container can essentially be reduced or even eliminated.

Furthermore, by grinding the receptacle together with the sample material it can be achieved that the pieces generated from grinding the receptacle assist the grinding of the sample material. Thereby, efficiency of grinding the sample material can essentially be increased.

Thus, the method according to the invention allows for preparing of the sample material in a fast, simplified but also safe manner. In particular, it allows for minimizing sample losses and for preventing contamination.

Preferably, the complete receptacle as stored in the conditioning cabinet is placed in the extraction container and grinded by agitating the extraction container. Such placing allows for achieving a particularly fast and efficient process.

The method preferably further comprises as step of predefining a target grinding fineness, wherein the receptacle together with the sample material is grinded until the target grinding fineness is achieved. The term "grinding fineness" as used herein relates to a particle size when dry grinding is involved and to a solubility or solution rate when wet grinding is involved. Thus, the predefined grinding fineness may be a maximum or average particle size of the grinded sample or a predefined solution rate of the sample in a liquid. In embodiments where dry and wet conditions are present when grinding a mixture thereof may be involved. By predefining the target grinding fines, which can be a target maximum particle size or a solution rate, it can be assured that the sample material is provided in a condition in which it can efficiently be further processed and, particularly, provided for chemical or compositional analysis.

Preferably, the receptacle is at least partly made of glass or of a similar brittle and inert material. Additionally or alternatively, the receptacle can at least partly be made of polymethylpentene (PMP), polyethylene (PE) or polytetrafluoroethylene (PTFE or Teflon). Such material of the receptacle allows on one hand to store and provide the sample material in an inert environment such that impairment due to chemical reactions during storage can be reduced. On the other hand, such material allows for being broken down to smaller pieces in the mill apparatus which assist the grinding of the sample material. Like this, the grinding of the sample material can be essentially more efficient.

In particular, for this purpose, grinding the receptacle preferably comprises producing splinters assisting the at least one grinding element in grinding the sample material. Thereby, the splinters can also act as grinding, cutting or other material breaking-down elements. The term "splinter" in this connection relates to any possible part or bit of the receptacle generated by grinding it in the mill apparatus. It can be or comprise any chips, slivers, splitters or similar parts.

Preferably, the extraction container of the mill apparatus has an essentially tube-like shape. Such tube-like shape may involve an elongated form, wherein the tube may be completely open on one longitudinal end and completely closed at the other longitudinal end. The tube-like shape can be established by an essentially cylindrical portion or the like. Advantageously, the tube-like extraction container has a tapered bottom. Such tube-like shaped extraction container allows for efficient agitation and processing. In particular, it allows for a comparably complete gathering of the sample material after being grinded, i.e. after agitation of the mill apparatus. Such an extraction container can be referred to as extraction tube. The at least one grinding element can have any suitable form and composition and can be adapted in correspondence with the sample material to be grinded. For example, depending on the kind of sample material such as a tablet, pill or paste, an appropriate grinding element can be chosen.

Preferably, the at least one grinding element has an essentially spherical shape. Such spherical grinding element can be beneficial in connection with many kind of sample materials. In addition, they can be agitated or moved in a comparably efficient manner due to their rounded form. Advantageously, plural spherical grinding elements of differing sizes are used.

Preferably, the receptacle has a cap closing an interior of the receptacle, wherein the method comprises removing the cap prior to placing the sample material together with the receptacle in the extraction container. Such closed receptacle allows for providing the sample material in a protected and safe manner. The term "cap" as used herein can relate to any suitable cover or closure allowing to safely close the interior of the receptacle. In an advantageous embodiment the cap seals an opening of the receptacle. It can be embodied to be tightly screwed onto the receptacle. Or, it can comprise a metal part crimped about a neck of the opening or any other safe closing structure. Also, it can have a sealing part such as a rubber stopper which allows to tightly seal the opening of the receptacle. Thus, the cap may be a multi component structure.

Thereby, removing the cap preferably comprises breaking off the cap from the receptacle. Particularly, when the cap includes parts which may impair proper grinding of the sample material and for which are not easy to remove from the receptacle, breaking of the cap can be an efficient way for getting rid of the cap. Thereby, a portion of the receptacle itself such as its neck may be broken. For example, in embodiments of receptacles having a rubber stopper which is on one hand comparably difficult to withdraw from the receptacle and on the other hand can impair the grinding, breaking off the cap can be particularly beneficial.

Preferably, the method comprises sterilizing the receptacle prior placing it in the extraction container. Like this it can be assured that no contamination on the outside of the receptacle will end up in the sample material during grinding. For sterilizing the receptacle any appropriate measure can be applied. For example, the receptacle can be sterilized by providing ethylene oxide (EtO), hydrogen peroxide (H2O2), or a suitable irradiation.

The mill apparatus used in the method preferably is a ball mill apparatus. Such ball mill apparatus can be particularly beneficial since it allows to mill or grind substances in closed containers. Like this, sterility can be achieved or contamination can be reduced. Further, such ball mill apparatus allows for efficiently grinding substances such as the sample to a sufficient degree.

In another aspect, the invention is an automated system for the preparation of a sample material. The automated system comprises: (i) a mill apparatus having an extraction container, at least one grinding element provided in the extraction container, and an agitator configured to agitate the extraction container; (ii) a conditioning cabinet configured to store a receptacle provided with a sample material at predefined conditions; and (iii) a handling robot configured to take the receptacle from the conditioning cabinet and to provide the receptacle with the sample material into the extraction container. The mill apparatus is configured to grind the receptacle with the sample by the agitator agitating the extraction container.

The term "robot" as used herein can relate to any suitable means for automatically handling the receptacle. It can be or comprise an arm robot, a linear robot or the like. The robot can be programmable itself or connected to a controller which can be programmable.

In particular, the automated system comprises a controller for controlling the mill apparatus and the handling robot. The controller can be or comprise a computing device, such as a desktop computer, a laptop computer, a tablet, a server computer or the like, and can be programmable in an appropriate manner. It can allow for configuring the handling robot an the mill apparatus in accordance with the invention.

The automated system according to the invention and its preferred embodiments allow for implementing the effects and benefits described above in connection with the method according to the invention and its preferred embodiments.

Preferably, the automated system is configured, e.g., by the controller, to grind the receptacle together with the sample material until a predefined target grinding fineness is achieved.

In one preferred embodiment, the receptacle has a cap closing an interior of the receptacle and the handling robot is configured, e.g. by the controller, to provide the receptacle in the extraction container with the receptacle being closed by the cap.

In another preferred embodiment, the receptacle has a cap closing an interior of the receptacle and the handling robot is configured, e.g. by the controller, to remove the cap prior to placing the sample material together with the receptacle in the extraction container. Thereby, the handling robot preferably is configured, e.g. by the controller, to remove the cap by breaking off the cap from the receptacle.

Preferably, the extraction container of the mill apparatus has an essentially tube-like shape. The at least one grinding element preferably has an essentially spherical shape.

The mill apparatus of the automated system preferably is a ball mill apparatus.

BRIEF DESCRIPTION OF THE DRAWINGS

The method according to the invention and the automated system according to the invention are described in more detail herein below by way of exemplary embodiments and with reference to the attached drawings, in which.

DESCRIPTION OF EMBODIMENTS

In the following description certain terms are used for reasons of convenience and are not intended to limit the invention. The terms "right", "left", "up", "down", "under" and "above" refer to directions in the figures. The terminology comprises the explicitly mentioned terms as well as their derivations and terms with a similar meaning. Also, spatially relative terms, such as "beneath", "below", "lower", "above", "upper", "proximal", "distal", and the like, may be used to describe one element's or feature's relationship to another element or feature as illustrated in the figures. These spatially relative terms are intended to encompass different positions and orientations of the devices in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. The devices may be otherwise oriented (rotated 90 degrees or at other orientations), and the spatially relative descriptors used herein interpreted accordingly. Likewise, descriptions of movement along and around various axes include various special device positions and orientations.

To avoid repetition in the figures and the descriptions of the various aspects and illustrative embodiments, it should be understood that many features are common to many aspects and embodiments. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

Figure 1:
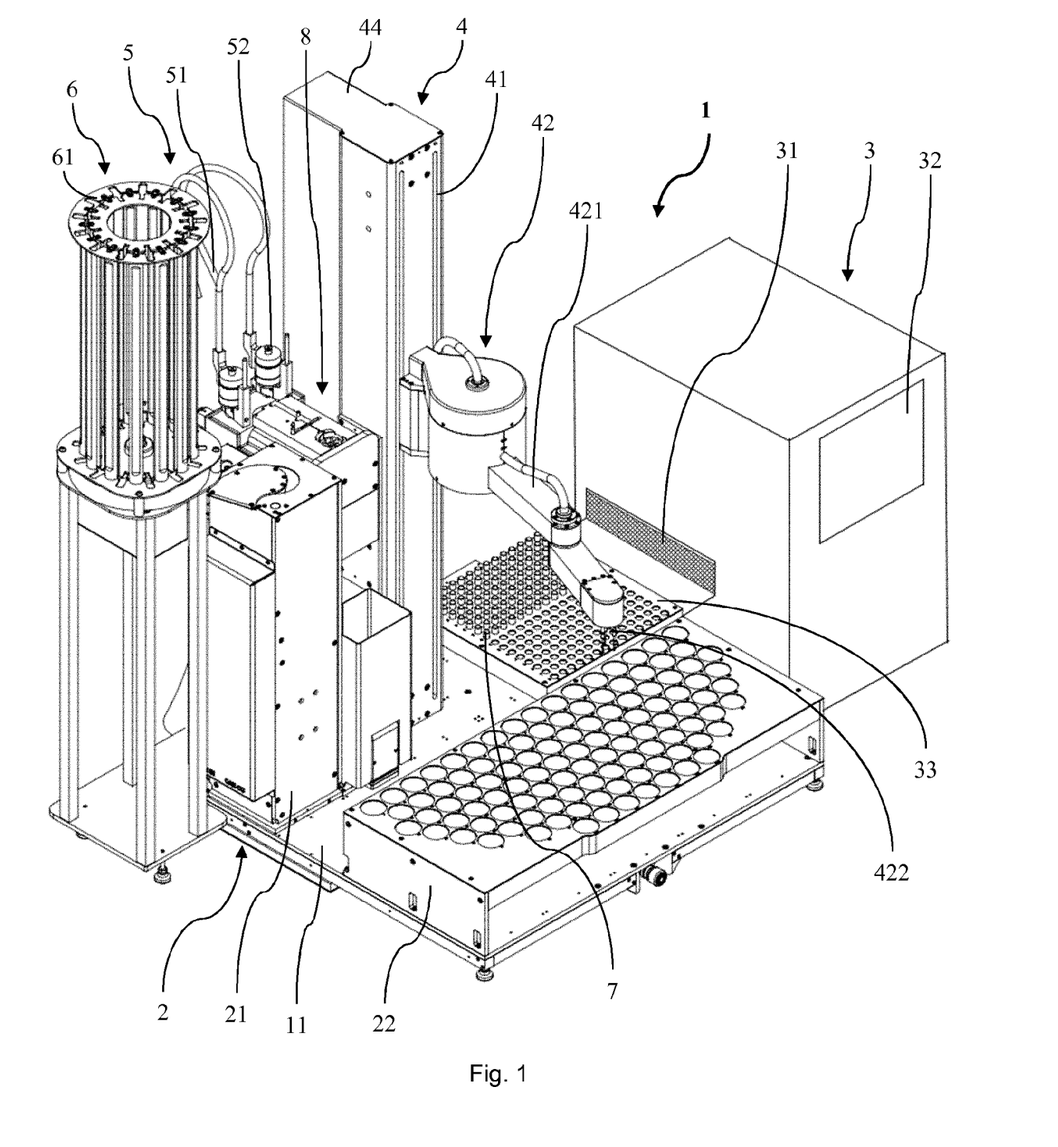
FIG. 1 shows a perspective view of an embodiment of an automated system according to the invention for implementing an embodiment of a method according to the invention.

FIG. 1 shows an embodiment of an automated system 1 for the preparation of a sample material according to the invention, which is intended to implement an embodiment of a method of automated preparation of a sample material for a chemical or compositional analysis according to the invention. The automated system 1 is also referred to as preparation assembly 1. It comprises a handling robot 4, a ball mill apparatus 2, a conditioning cabinet 3, a dosing apparatus 5, a filter dispenser 6 and a sample processing unit 8.

The preparation assembly 1 is equipped with a platform 11 on which several components are positioned. The platform 11 has height adjustable feet which allow for aligning the platform 11 such that it lies in an essentially horizontal plane. The conditioning cabinet 3 is located right-hand aside the platform 11. It has a box like shape wherein on one of its sidewalls a touch screen 32 is arranged. At its sidewall oriented towards the platform 11 the conditioning cabinet 3 is equipped with a port 31. The conditioning cabinet 3 has a plurality of drawers on which vial racks 33 are arranged. In FIG. 1 it is shown that one of the drawers is shifted out of port 31 onto the platform 11. The vial rack 33 has recesses in which glass vials 7 are received as receptacles. The vials 7 house various sample materials.

In the interior of the conditioning cabinet 3, plural parameters can be adjusted via the touch screen 32. For example, temperature, humidity, pressure and the like are adjustable parameters. More specifically, the interior of the conditioning cabinet 3 is divided in plural compartments in which different drawers with according vial racks are positioned. In the compartments the parameters can be differently adjusted wherein the desired values can be set on the touch screen 32. Furthermore, the conditioning cabinet 3 comprises an automatic moving mechanics located in its interior, which allows for relocating the drawers in and between the different compartments and for providing the drawers through the port 31 out of the conditioning cabinet 3, e.g. to the platform 11.

The handling robot 4 has a vertical stand 44 which is equipped with vertically extending parallel rails 41. On the rails 41 an arm unit 42 is slidably mounted such that the arm unit 42 can vertically move along the rails 41. The arm unit 42 has a cylinder portion, which is pivotable about a vertical axis and an arm 421 with joints ending in gripping fingers 422.

The ball mill apparatus 2 has an agitating station 21 which is positioned at a left hand side of the platform 11. It further has an extraction tube rack 22 which extends along the complete front side of the platform 11. Between the agitating station 21 of the ball mill apparatus 2 and the stand 44 of the handling robot 4 the dosing apparatus 5 and the sample processing unit 8 are positioned. The dosing apparatus 5 has two needles 51 and two sucking pumps 52, wherein each pump 52 is coupled to one of the needles 51 by a flexible tube.

Figure 2:
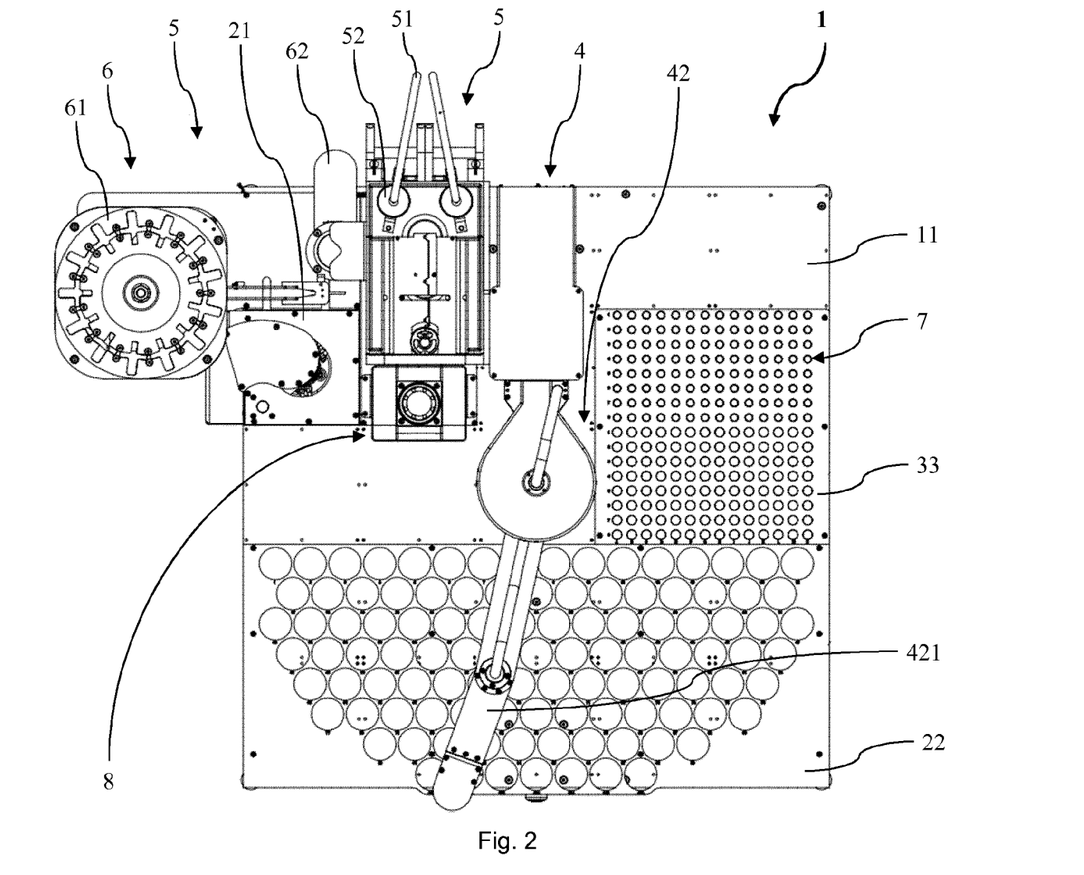
FIG. 2 shows a top view of the automated system of FIG. 1.

In FIG. 2 the preparation assembly 1, except its conditioning cabinet, is shown top down. Thereby, it can be seen that the filter dispenser 6 has a filter storage 61 positioned left hand aside the platform 11 and a filter disposer 62 positioned left hand aside the dosing apparatus 5. The extraction tube rack 22 forms the front of the preparation assembly 1 and the other components, i.e. the agitating station 21, the dosing apparatus 5, the sample processing unit 8, the handling robot 4 and the vial rack 33 are arranged behind the extraction tube rack 22.

Figure 3:
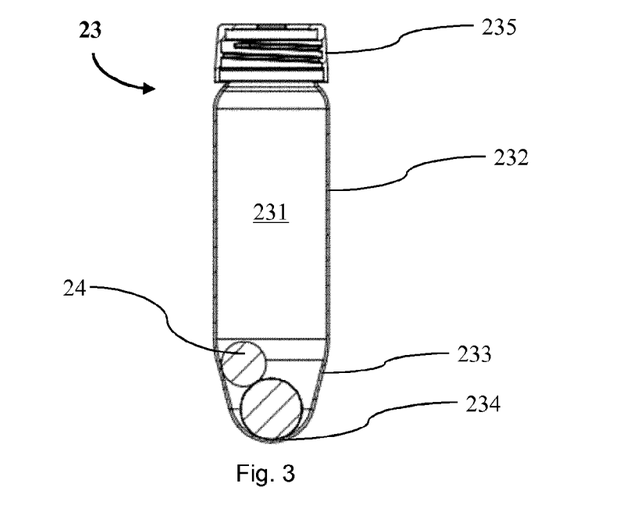
FIG. 3 shows a cross sectional view of an extraction tube of a ball mill apparatus of the automated system of FIG. 1.

FIG. 3 shows an extraction tube 23 of the ball mill apparatus 2 of the preparation assembly 1. The extraction tube 23 has a tube-like shape with a vertically extending cylindrical portion 232. At its lower end the cylindrical portion 232 passes over in a tapering portion 233 which ends in a rounded bottom 234. At its top end an interior 231 of the extraction tube 23 is shut by a closure 235. In particular, the upper end of the cylindrical portion 232 is equipped with an outer thread and the closure 235 with a corresponding inner thread. For shutting the extraction tube 23 the closure 235 is screwed onto the cylindrical portion 232.

In the interior 231 of the extraction tube 23 two spherical grinding balls 24 of the ball mill apparatus 2 are arranged as grinding elements. The grinding balls 24 have different sizes allowing for a particularly efficient grinding.

Figure 4:
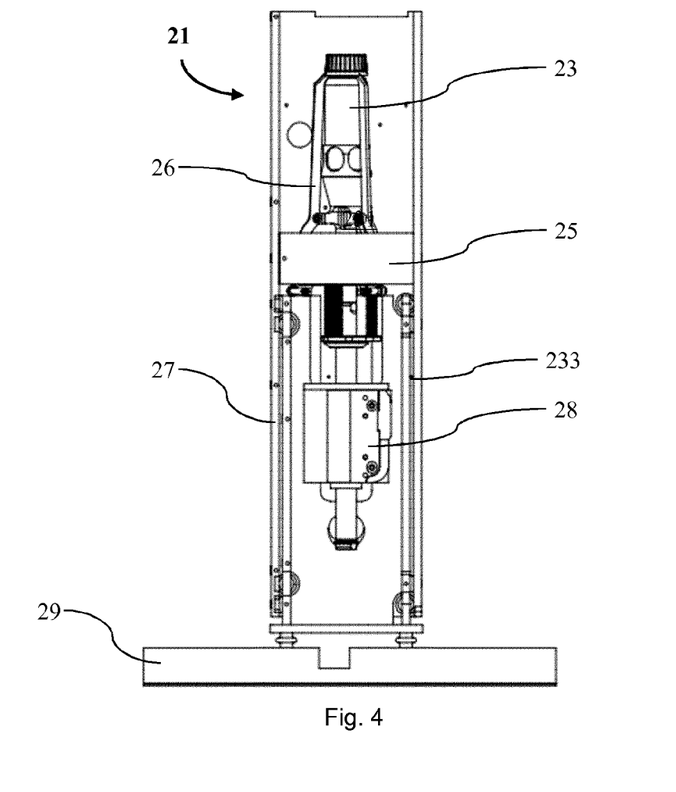
FIG. 4 shows a side view of the ball mill apparatus of the automated system of FIG. 1.

In FIG. 4 the agitating station 21 of the ball mill apparatus 2 is shown in more detail. It comprises a housing 27 mounted to a base 29, support arms 26 and an arm clamping plate 25 is arranged inside the housing 27. Vertically through the arm clamping plate 25 the extraction tube 23 extends. It is held by the support arms 26 which are pressed on an outer surface of the extraction tube 23 by the arm clamping plate 25. Below the extraction tube 23 a drive 28 is positioned and coupled to the to the extraction tube 23.

In operation, the drive 28 moves the extraction tube 23. Like this, the extraction tube 23 is brought in vibrating and shaking movements. Thereby, the grinding balls 24 are moved through the interior 231 of the extraction tube 23 such that any material inside the extraction tube 23 is grinded.

In the embodiment of the method according to the invention, a sample material is arranged in one of the vials 7. The vial 7 together with the sample is stored in the vial rack 33 which is arranged in the conditioning cabinet 3 until shortly before the sample material is to be analysed, e.g. by HPLC. Then the vial rack 33 with the vial 7 is positioned on the platform 11. The handling robot 4 takes the vial 7 with its gripping fingers 422 and places it into one of the extraction tubes 23 pre-positioned in the extraction tube rack 22. The handling robot 4 closes the extraction tube 23 and relocates it into the agitating station 21 of the ball mill apparatus 2. There, the sample material together with the vial 7 is grinded by the drive 28 agitating the extraction tube 23 and in particular the grinding balls 24. More specifically, the sample material together with the vial 7 is grinded until a target grinding fineness is achieved. During the grinding the splinters are produced which assist the grinding balls 24 in grinding the sample material.

After the sample being grinded, the extraction tube 23 is relocated into the extraction tube rack 22 where it is ready for further preparation by the sample processing unit 8. When being readily prepared, the sample material is transferred to a vial again and then analysed in an appropriate HPLC equipment.

This description and the accompanying drawings that illustrate aspects and embodiments of the present invention should not be taken as limiting—the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the Figs. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope.

The invention claimed is:

1. A method of automated preparation of a sample material for a chemical or compositional analysis comprising: arranging the sample material in a receptacle; storing the sample inside the receptacle in a conditioning cabinet; grinding the sample material by way of a mill apparatus, wherein the mill apparatus comprises an extraction container, at least one grinding element provided in the extraction container and an agitator adapted to move the at least one grinding element relative to the extraction container when the sample material is placed in the extraction container; placing the sample material together with the receptacle in the extraction container of the mill apparatus; and grinding the receptacle together with the sample material by agitating the extraction container of the mill apparatus, wherein the agitating comprises vibrating or shaking the extraction container such that the at least one grinding element moves inside the extraction container or activating the at least one grinding element by magnetic forces.

2. The method of claim 1, wherein the receptacle in its entirety as stored in the conditioning cabinet is placed in the extraction container and grinded by agitating the extraction container.

3. The method of claim 1, further comprising predefining a target grinding fineness, wherein the receptacle together with the sample material is grinded until the target grinding fineness is achieved.

4. The method of claim 1, wherein the receptacle is at least in part made of glass or of a similar brittle and inert material.

5. The method of claim 1, wherein the receptacle is at least in part made of polymethylpentene, polyethylene, or polytetrafluoroethylene.

6. The method of claim 1, wherein grinding the receptacle comprises producing splinters for assisting the at least one grinding element in grinding the sample material.

7. The method of claim 1, wherein the extraction container of the mill apparatus has an essentially tube-like shape.

8. The method of claim 1, wherein the at least one grinding element has an essentially spherical shape.

9. The method of claim 1, wherein the receptacle has a cap closing an interior of the receptacle, and the method further comprises removing the cap prior to placing the sample material together with the receptacle in the extraction container.

10. The method of claim 9, wherein removing the cap comprises breaking off the cap from the receptacle.

11. The method of claim 1, further comprising sterilizing the receptacle prior to placing it in the extraction container.

12. The method of claim 1, wherein the mill apparatus is a ball mill apparatus.

13. An automated system for the preparation of a sample material, comprising:
    a mill apparatus comprising an extraction container, at least one grinding element provided in the extraction container, and an agitator configured to agitate the extraction container;
    a conditioning cabinet configured to store a receptacle provided with a sample material at predefined conditions; and
    a handling robot configured to take the receptacle from the conditioning cabinet and to place the receptacle with the sample material into the extraction container,
    wherein the mill apparatus is configured to grind the receptacle with the sample material by the agitator agitating the extraction container.

14. The automated system of claim 13, wherein the mill apparatus is configured to grind the receptacle together with the sample material until a predefined target grinding fineness is achieved.

15. The automated system of claim 13, wherein the receptacle has a cap closing an interior of the receptacle and the handling robot is configured to place the receptacle in the extraction container with the receptacle being closed by the cap.

16. The automated system of claim 13, wherein the receptacle has a cap closing an interior of the receptacle and the handling robot is configured to remove the cap prior to placing the sample material together with the receptacle in the extraction container.

17. The automated system of claim 16, wherein removing the cap comprises breaking off the cap from the receptacle.

18. The automated system of claim 13, wherein the extraction container of the mill apparatus has an essentially tube-like shape.

19. The automated system of claim 13, wherein the at least one grinding element has an essentially spherical shape.

20. The automated system of claim 13, comprising a controller for controlling the mill apparatus and the handling robot.

21. The automated system of claim 13, wherein the mill apparatus is a ball mill apparatus.

\* \* \* \* \*